United States Patent
Larson et al.

(12)
(10) Patent No.: US 6,240,878 B1
(45) Date of Patent: *Jun. 5, 2001

(54) AUTOMATIC MILKING MACHINE ARM DETACHER WITH SLOPING SPLASH SHIELD

(75) Inventors: Larry G. Larson, Holmen; Patrick M. Hein, LaCrosse; Robert G. Krause, Onalaska, all of WI (US)

(73) Assignee: Babson Bros. Co., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/399,623

(22) Filed: Sep. 20, 1999

Related U.S. Application Data

(63) Continuation of application No. 09/059,553, filed on Apr. 13, 1998, now Pat. No. 5,960,537.

(51) Int. Cl.⁷ ........................................................ A01J 5/04
(52) U.S. Cl. ........................................................ 119/14.08
(58) Field of Search .............................. 119/14.05, 14.08, 119/14.1, 14.13

(56) References Cited

U.S. PATENT DOCUMENTS

| | | |
|---|---|---|
| Re. 29,848 * | 11/1978 | Schluckbier ...................... 119/14.08 |
| 3,583,366 | 6/1971 | Zhuk et al. . |
| 3,726,252 | 4/1973 | Needham et al. . |
| 3,789,798 | 2/1974 | Reisgeis et al. . |
| 3,861,355 | 1/1975 | Johnson et al. . |
| 3,893,422 * | 7/1975 | Schintzler et al. ................ 119/14.08 |
| 3,929,103 | 12/1975 | Schluckbier . |
| 3,938,470 | 2/1976 | Pace . |
| 3,973,520 | 8/1976 | Flocchini . |
| 4,228,764 * | 10/1980 | Plett ................................... 119/14.08 |
| 4,333,421 | 6/1982 | Schluckbier . |
| 4,685,422 | 8/1987 | Middle et al. . |
| 4,715,321 | 12/1987 | Vandenberg et al. . |
| 4,838,203 * | 6/1989 | Ellis et al. ......................... 119/14.08 |
| 5,809,931 * | 9/1998 | Ellis et al. ......................... 119/14.08 |
| 5,960,737 * | 10/1999 | Larson et al. ..................... 119/14.08 |

* cited by examiner

Primary Examiner—Thomas Price
(74) Attorney, Agent, or Firm—Lathrop & Clark LLP

(57) ABSTRACT

A milk machine detaching mechanism suitable for use in a sloping splash panel or other vertically limited space, having a pair of opposing components that can transfer load in the vertical direction, but which slide relative to one another in a lateral direction. The detacher is capable raising a milk machine support arm in a smooth and arc-shaped direction to avoid contact with a cow or a cow support platform as the support arm is being withdrawn. The detacher includes a folding arm assembly to minimize potential pinch points.

9 Claims, 7 Drawing Sheets

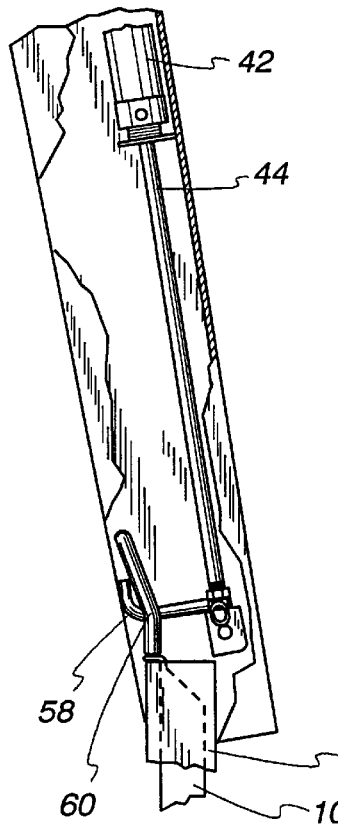
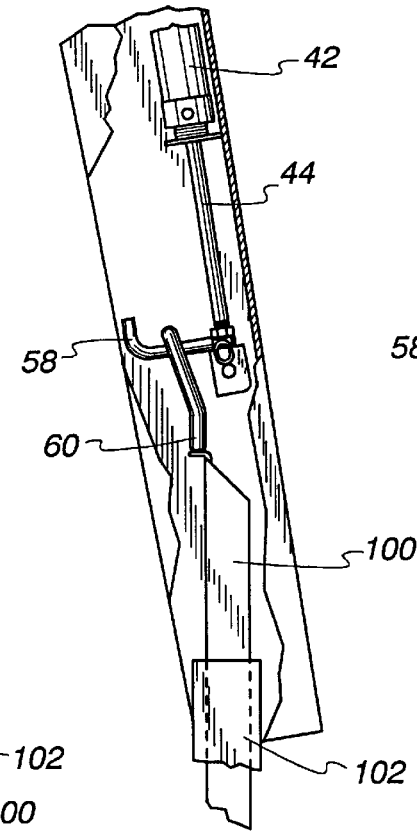
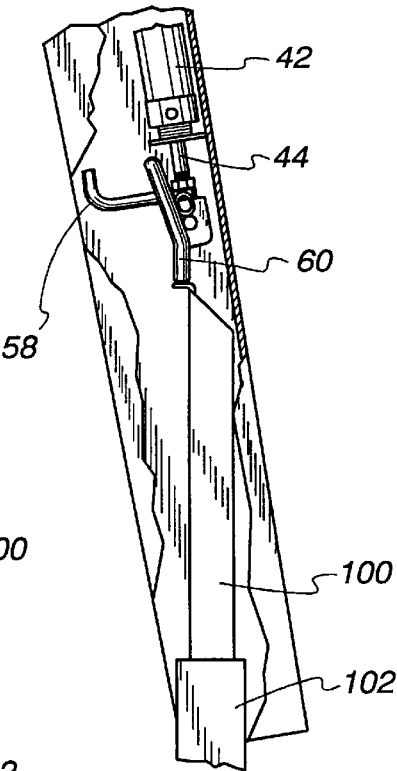
Fig. 5a  Fig. 6a  Fig. 7a
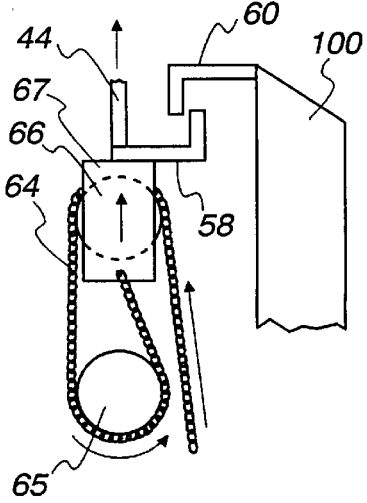
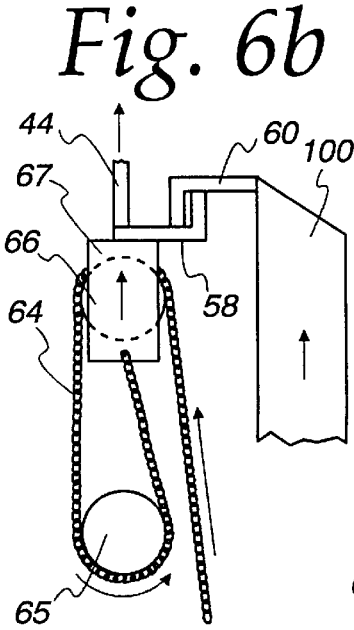
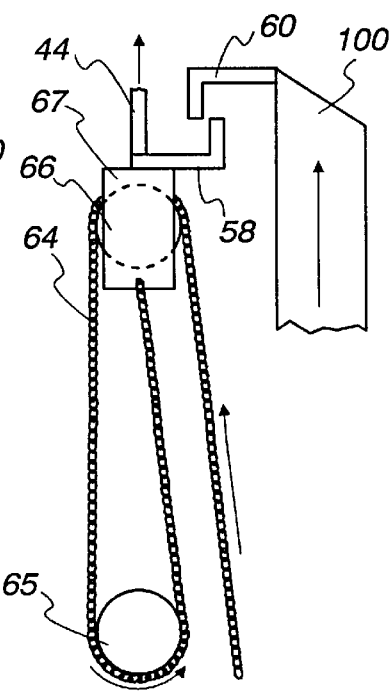
Fig. 5b  Fig. 6b  Fig. 7b

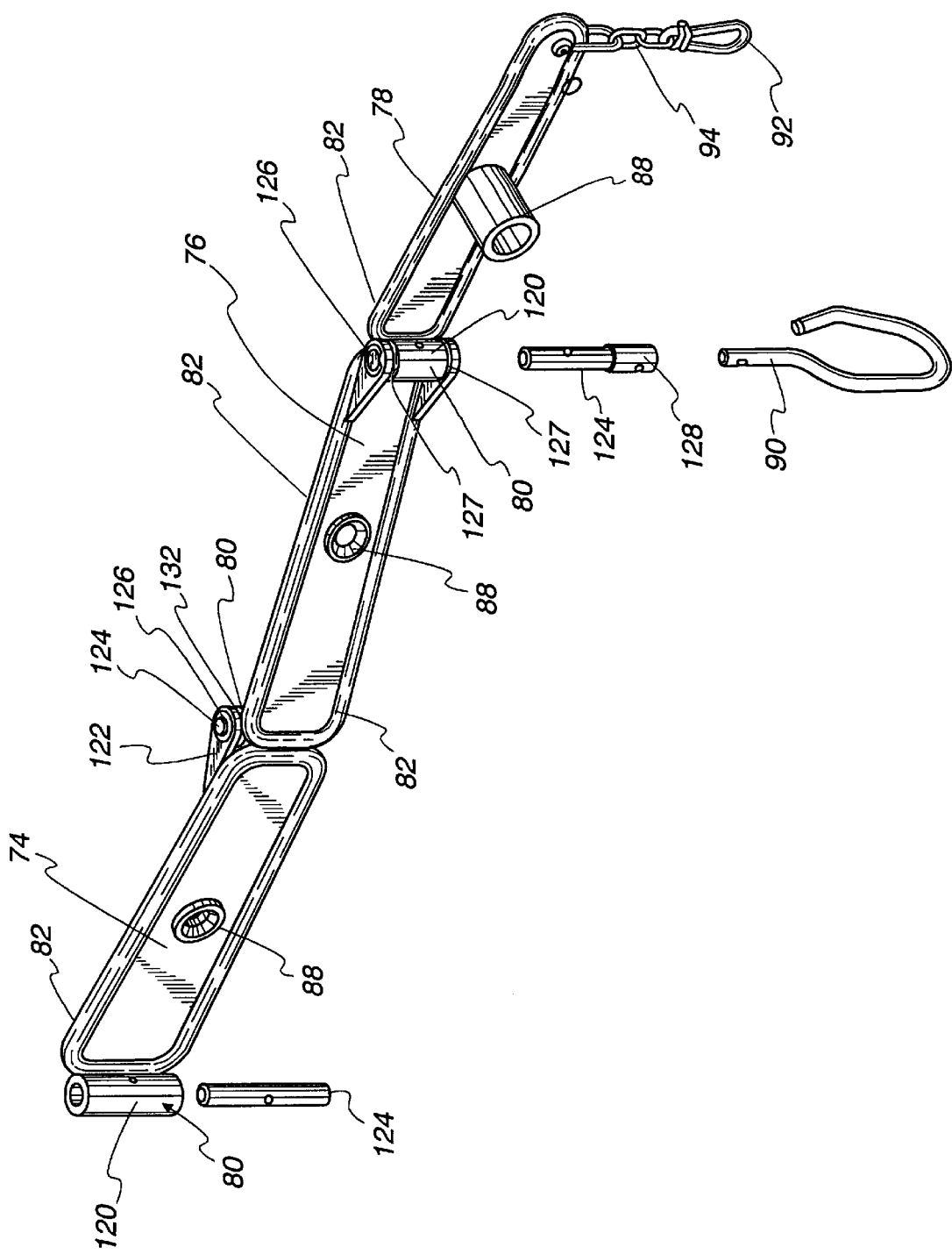

AUTOMATIC MILKING MACHINE ARM DETACHER WITH SLOPING SPLASH SHIELD

This application is a continuation of application Ser. No. 09/059,553 filed Apr. 13, 1998, now U.S. Pat. No. 5,960,537, the disclosure of which is incorporated by referenced herein.

FIELD AND BACKGROUND OF THE INVENTION

The present invention relates generally to milking machine detacher mechanisms and particularly to an automatic milking machine detacher mechanism useful for being mounted in a sloping splash shield or other space-constrained location.

Automatic arm detachers for milking machines have been in use for many years. Typically, the detacher mechanism is mounted on a wall or a rail adjacent to the milking machine or is mounted inside a vertical splash shield to save space and maintain the cleanliness of the mechanism.

When the detacher mechanism is mounted inside of a cabinet or splash shield the mechanism includes a pneumatic cylinder, a chain, pulleys, and a counterweight that moves vertically as the detacher mechanism retracts the milking machine. Due to the length of the milking machine support arm and the distance between the detacher mechanism and the milking stall, the distance of vertical movement by the pneumatic cylinder piston and the counterweight is considerable. Where space is not a concern, such as in vertically oriented panels or splash shields, the traditional detacher arrangement is useful and dependable. When, however, vertical space is at a premium the traditional mechanism is not practical and will not work dependably.

Thus, there is needed a detacher mechanism for a milking machine that can be used in a sloping splash shield or other space that does not permit large vertical movement of mechanism components.

SUMMARY OF THE INVENTION

A milking machine detacher in accordance with the present invention includes: a reciprocating piston that reciprocates in response to the action of a pneumatic cylinder or similar mechanism; a first clevis fixed to the reciprocating piston; a first chain having a first end fixed to the reciprocating piston and a second end; an articulated milker arm joined to the second end of the chain; a milker arm support joined to the articulated milker arm; a second clevis joined to the milker arm support and arranged to be engaged by the first clevis; a second chain having a first end connected to the milker arm support and a second end; and a counterweight joined to the second end of the second chain.

The milking machine detacher may further include: a sloped splash panel in which the piston, the first clevis, the second clevis are mounted, and the counterweight are mounted. The milking machine detacher milker arm support may include a tapered upper end for reducing necessary clearance within the sloped splash panel.

The milking machine detacher may further include an automatic controller for operating the piston, such as a programmable logic controller on a milking machine. The first clevis and the second clevis are preferably disengaged when the detacher is at a fully extended position, engaged during a detacher retracting movement; and disengaged at a detacher retracted position to provide an arc-shaped movement of the milker arm and avoid dragging a milking machine on the cow platform.

The milking machine detacher preferably includes a first roller fixed to the reciprocating piston and in sliding contact with the first chain; and a second roller fixed against vertical movement and in sliding contact with the first chain so that the chain will be retracted a distance greater that the distance the reciprocating piston. Further, the first clevis preferably includes a longitudinal horizontal axis, and the second clevis includes a longitudinal horizontal axis orientated at an angle to the horizontal axis of the first clevis so that the devises can transfer vertical load, but will slide relative to one another as the first clevis moves laterally during the retracting motion.

These and other features and benefits are described in detail below.

BRIEF DESCRIPTION OF THE DRAWINGS

FIG. 5a is a partial side view of the detacher mechanism in the fully extended position.

FIG. 5b is a partial side view of the detacher chain at the start of the detaching motion.

FIG. 6a is a partial side view of the detacher mechanism partially through the detaching motion.

FIG. 6b is a partial side view of the detacher chain partially through the detaching motion.

FIG. 7a is a partial side view of the detacher mechanism in the retracted position.

FIG. 7b is a side view of the detacher chain in the retracted position.

FIG. 8 is a partial exploded view of an arm assembly in accordance with the present invention.

DESCRIPTION OF THE PREFERRED EMBODIMENT

Figure 1:
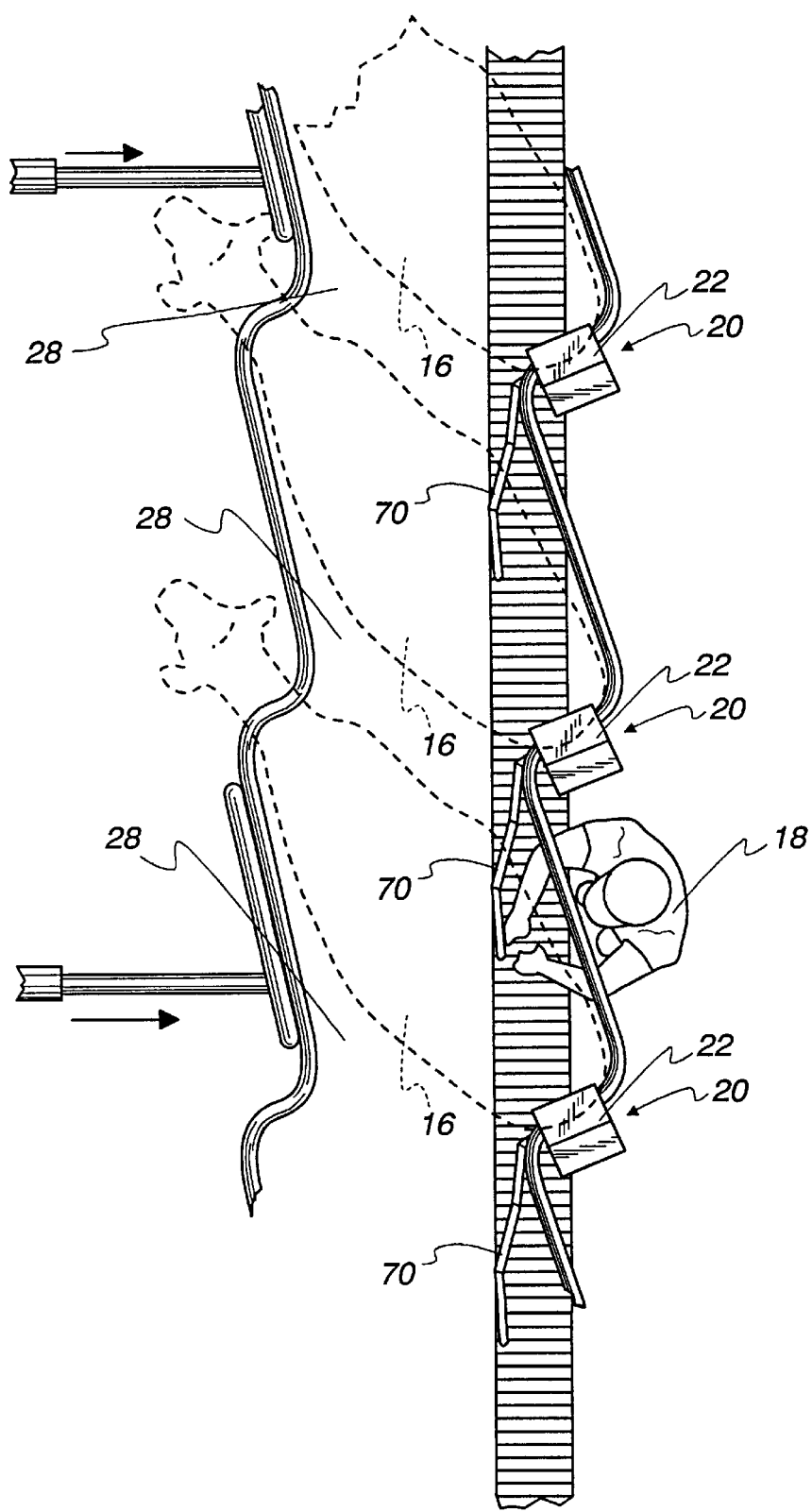
FIG. 1 is a partial plan view of a herringbone milking parlor with sloped splash shields in accordance with the present invention.

In the following detailed description of the drawings, the same reference numerals will be used for the same or similar item in each of the figures. Illustrated in FIG. 1 and referred to generally by 20 is an automatic milker arm detacher in accordance with the present invention. The detacher 20 is mounted inside a sloped splash panel 22.

The sloped splash panel 22 is positioned near the rear of milking stalls 28 that are arranged in a herringbone pattern. Such a stall pattern is a space-efficient arrangement that optimizes dairy parlor space, but presents severe space constraints for personnel and equipment. One way to accommodate a herringbone stall arrangement is to use sloped splash panels 22 which provide a back-stop for the cows 16 and protect the milker operator 18. Typically, splash panels are oriented vertically and can be used to contain an automatic detacher which has components that move vertically within the splash panel to retract a milker and milker support arm. When a sloped splash panel is used, there is insufficient vertical space for a traditional automatic detacher.

Thus, the detacher in accordance with the present invention is a space-saving design that can be used in a sloped splash panel 22 or anywhere space is at a premium. Of course, such a design can be also be used in an open area, but the sloped splash shield design benefits most with the present invention.

Figure 2:
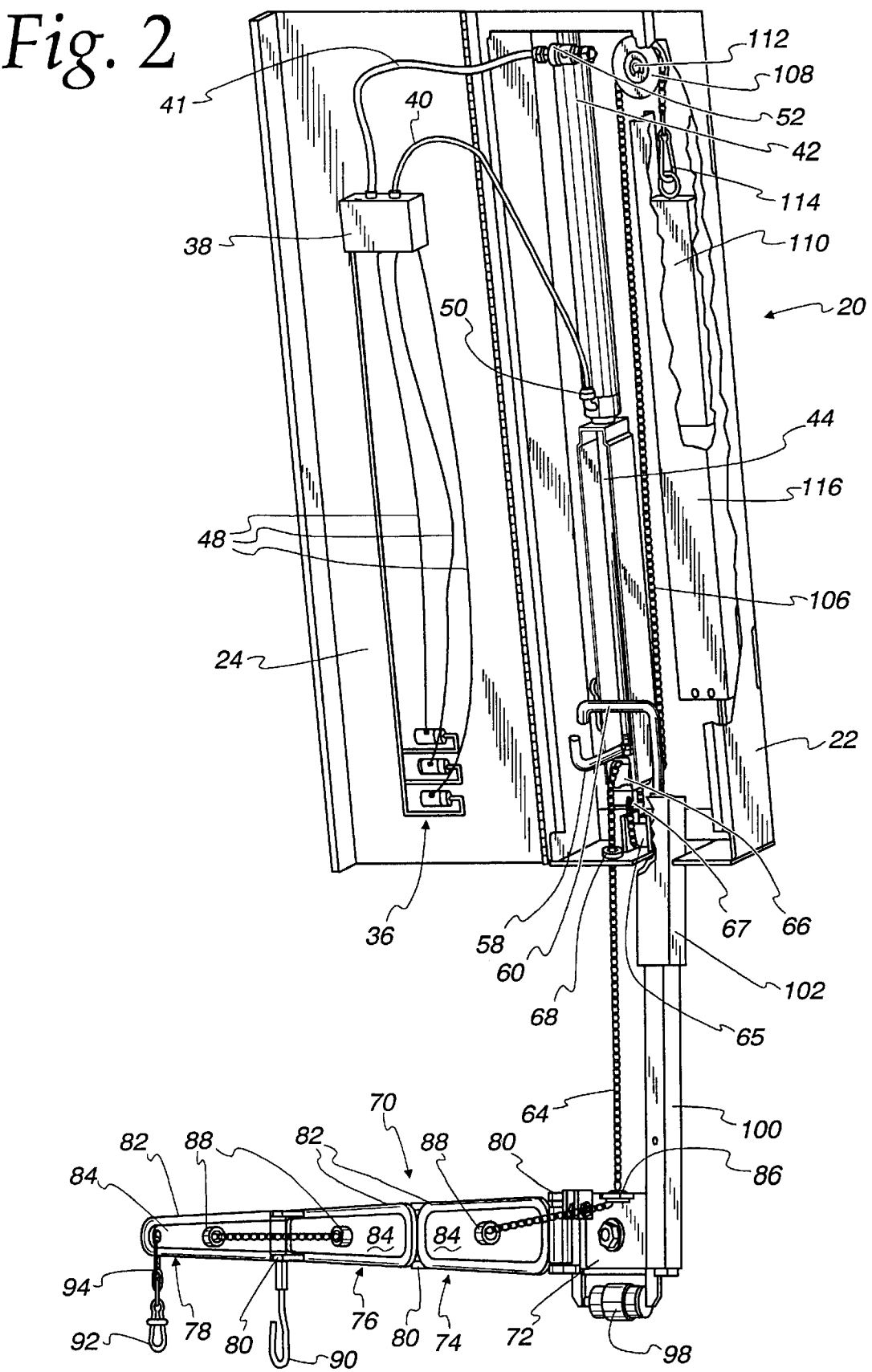
FIG. 2 is a perspective view of a sloping splash shield with an automatic arm detacher in the fully extended position in accordance with the present invention.
Figure 3:
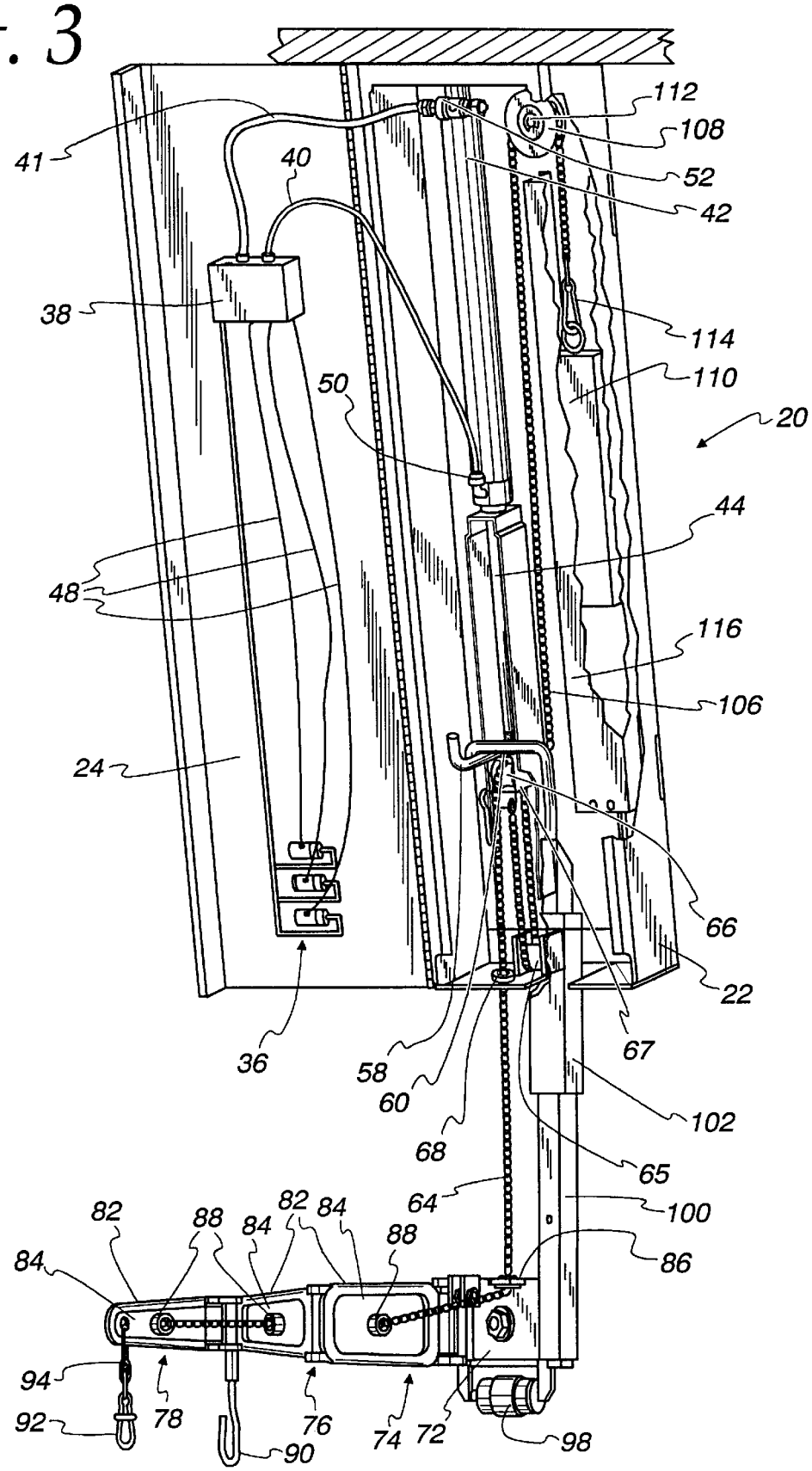
FIG. 3 is a perspective view of the automatic milking machine arm detacher in a retracting position.
Figure 4:
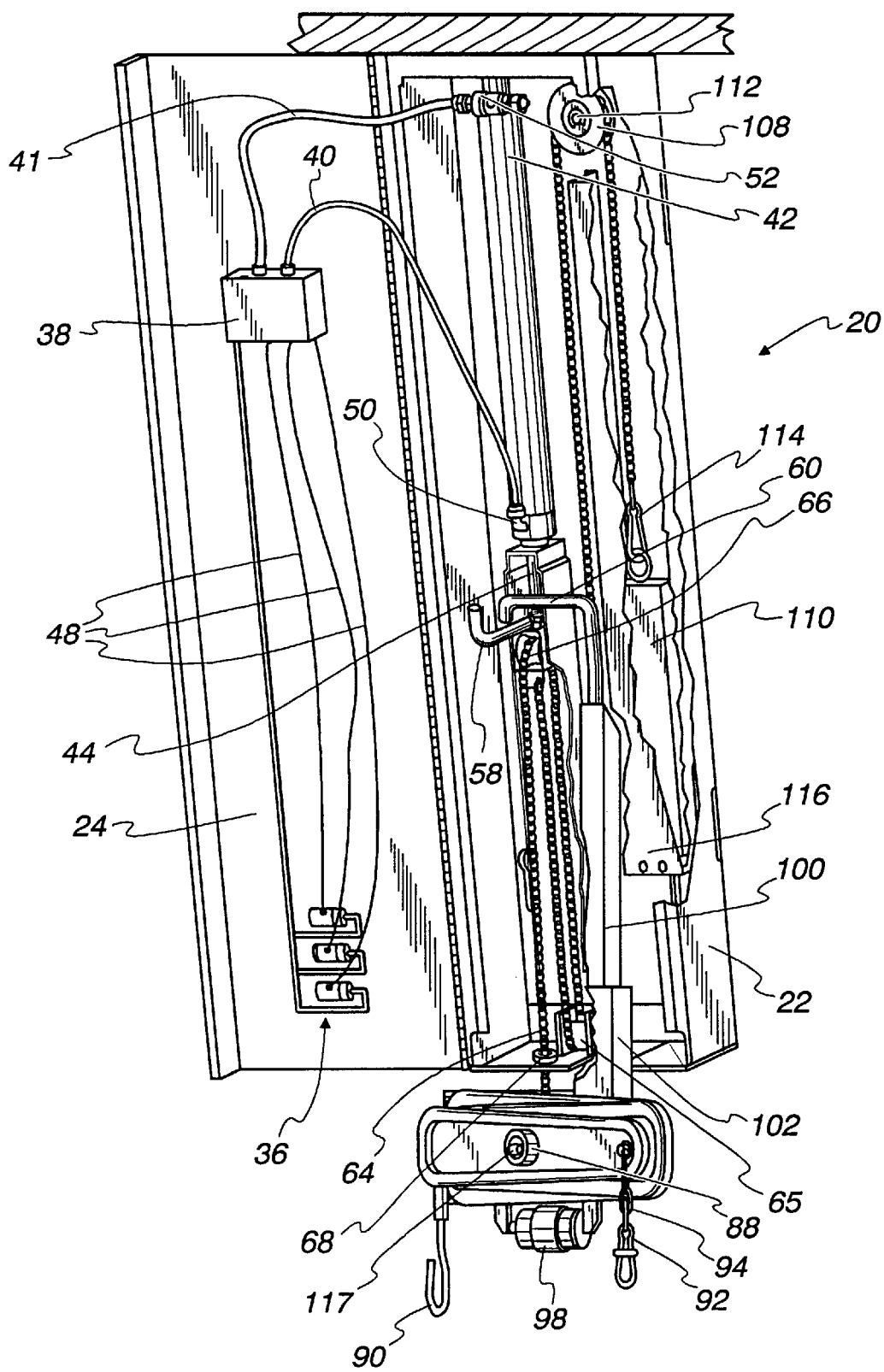
FIG. 4 is a perspective view of the automatic milking machine arm detacher in a fully retracted position.

FIGS. 2 to 4 illustrate that the detacher 20 is contained almost entirely within sloped splash panel 22 and hinged access door 24. The sloped splash panel 22 is at an acute angle relative to vertical and at least 11 degrees which is the angle at which traditional vertical detacher mechanisms fail to work reliably. The detacher 20 includes: pneumatic or electronic controls 36; a pneumatic\electronic controller 38 in communication with the pneumatic or electronic controls 36; a pair of hoses 40 and 41 in communication with the pneumatic controller 38; and a pneumatic cylinder 42 that includes a reciprocating shaft or piston 44. The pneumatic or electronic controls 36 can be either manual switches, programmable switches, or electronic relays from a remote electronic controller such as a milk meter that activates the detacher 20 at the completion of cow milking.

The pneumatic or electronic controls 36 activate the pneumatic\electronic controller 38 with a suitable pneumatic or electronic signal transmitted through hoses or wires 48. The pneumatic\electronic controller 38 feeds air to the pneumatic cylinder 42 via hose 40 and hose elbow 50. The pneumatic controller 38 releases air via hose 41 and a quick exhaust valve 52. When air is fed to the pneumatic cylinder 42, the piston 44 moves out of the cylinder 42 and downward. Conversely, when air is exhausted from the pneumatic cylinder 42 the piston 44 is retracted upward and into the cylinder. The piston 44 reciprocates along the same acute angle of the sloped splash panel 22. Although the pneumatic cylinder is preferred, other lifters such as hydraulic cylinders for example, may be used. Further, the reciprocating member can be a rod, shaft, pipe, tube and all are included within the term "piston," as used herein.

At the lower end of the piston 44 is a first clevis 58 which is formed from a cylindrical rod joined at one end to the piston 44 and having a hooked outer end. The first clevis 58 includes an elongated central portion having a longitudinal horizontal axis for engaging a second clevis 60 which is also formed from a cylindrical rod and includes a central longitudinal horizontal axis and a hooked outer end. Although depicted as cylindrical, the first clevis 58 and the second clevis 60 need not be cylindrical, but can be other shapes as well, so long as the two devises can transmit the vertical loads of the detacher 20 while sliding laterally relative to one another as described below. Thus, the term "clevis" includes bent cylindrical rods as illustrated, and other devices that transmit vertical, but not lateral loads during the retracting motion. The hook ends are merely provided to prevent the clevises from slipping off one another and not to carry loads during the retracting motion.

Also connected to the lower end of the piston 44 is a first chain 64 which extends downward, under a first roller 65 rotatably joined to the panel 22, over a second roller 66 rotatably joined to the piston 44 via a bracket 67, and through a hole in the splash panel 22. The rollers 65 and 66 interact to draw the first chain 64 upward an amount greater than the distance of movement by the piston.

The hole includes a bushing 68 that guides the chain 64 and prevents excessive rubbing. The first chain 64 extends farther downward into an arm assembly 70. Although depicted and described as a chain having metal links, the chain can be a rope, cord, wire or other means of transferring tension between the piston 44 and the arm assembly 70.

The arm assembly 70 includes: an arm support plate 72; a large arm segment 74; a medium arm segment 76; and a small arm segment 78 that are all connected to one another with hinges 80 using appropriate bushings for smooth and dependable movement of the arm assembly 70. Although depicted in gradually decreasing size, the arm assembly segments can be the same size, increasing size, random size or even include additional arm segment components depending upon the degree of articulation desired.

The arm segments 74, 76, 78 are preferably made using a cylindrical rod perimeter material 82 welded to the perimeter of an interior plate 84. The cylindrical rod 82 and interior plate 84 provide smooth, strong surfaces to protect both cow and operator. Further, to relieve possible pinch points, the rounded surfaces of the hinge 80 and cylindrical rod 82 are positioned within very close proximity to eliminate a pinch point along the axis of the hinge. The chain bushings 88 extend well through the arm segments 74, 76, 78 to provide horizontal spacing between each arm segment which also eliminates pinch points as discussed in detail below.

The first chain 64 engages the arm assembly 70 first through a bushing 86 in the top of the arm support plate 72 and then through three holes in the arm segments which include retaining rings and bushing assemblies 88 to reduce friction as the chain is pulled to retract the arm assembly 70. The end of the first chain 64 is secured on the back of the small arm segment 78 using any suitable stop mechanism 117 in FIG. 4. The arm assembly 70 may include additional components such as a hose hook 90 and a snap lock 92 suspended by a chain 94 to suspend the milking machine and hoses (not illustrated) from the arm assembly 70. Finally, the arm assembly 70 includes a sleeve and spring assembly 98 that functions as a shock absorber to reduce impact on the arm assembly 70 if a cow kicks any of the assembly components.

The arm assembly 70 is also connected to a downwardly extending arm support tube 100. The arm support tube 100 fits in a telescoping relationship to the arm support bearing housing 102 which includes bearings (not illustrated) to permit the arm support tube 100 free vertical movement relative to the arm support bearing housing 102. Further, the arm support bearing housing 102 can be used to adjust the limits of the vertical distance between the arm assembly 70 and the splash panel 22. Preferably, the arm support tube 100 has a tapered top end to accommodate the sloping splash panel 22 (see FIG. 7a).

On top of the arm support tube 100 is connected the second clevis 60. Also connected to the top of the arm support tube 100 is a second chain 106. The second chain 106 extends upwardly through the splash panel 22, over the top of a pulley 108, and is connected to a counterweight 110. The pulley 108 is mounted to the splash panel 22 using an appropriate pin, washer, and retaining ring assembly 112. The second chain 106 is joined to the counterweight 110 using any suitable means such as a shackle and snap lock assembly 114. The counterweight 110 is disposed for vertical movement inside a counterweight guide 116 which guides the counterweight 110 at about the same angle as the sloping splash panel 22.

In operation, the detacher 20 moves from the fully extended position with the arm assembly 70 fully extended and the arm support tube 100 in its lower most or fully extended position, as illustrated in FIG. 2, to the retracted position, illustrated in FIG. 4, with the arm assembly 70 completely folded and the arm support tube 100 in its upper most position. Between these two positions, the arm assembly 70 moves horizontal and vertically simultaneously so that the resulting movement of the arm assembly 70 is in an arc. This arc-shaped movement is desirable to prevent the milking machine from dragging on a cow platform or hitting a curb along the edge of the cow platform as the milking machine is being detached.

FIGS. 5b, 6b and 7b illustrate the relative motion of the first clevis 58 and the second clevis 60, as described above. These figures also illustrate the sequence of movement by the first chain 64, the first roller 66, and the second roller 65. As the first clevis 58 begins to rise so does the first roller 66, but the second roller 65 remains at the same elevation, next to the bottom of the splash panel 22.

As the first clevis 58 continues to rise along its acute angle the chain is drawn into the splash panel 22 because the rollers 65 and 66 are being spread apart. This continues until the first chain completely folds the arm assembly 70.

To retract the detacher 20 from the fully extended position (FIG.2), the pneumatic or electronic controls 36 activate the pneumatic\electronic controller 38 to exhaust air from the pneumatic cylinder 42 which in turn retracts the piston 44. This action pulls upward on the first chain 64 which then begins folding the arm assembly 70. As the piston 44 is retracted, the first clevis 58 begins rising as well, but because the first clevis 58 and the second clevis 60 are not in contact in the fully extended position, some distance must be traveled by the first clevis 58 before the two will engage. This is desirable so that the arm assembly 70 will begin folding before the arm assembly 70 and arm support tube 100 are raised up where they may strike the cow 16.

As seen in FIG. 3, the first clevis 58 and the second clevis 60 are engaged and the arm assembly 70 has begun to fold. The first clevis 58 has lifted the second clevis 60 slightly, which in turn has pulled up the arm support tube 100 through a portion of the arm support bearing housing 102. When the first clevis 58 and the second clevis 60 first engage their contact point is near the distal end of the respective clevises (FIG. 6a). As the first clevis 58 rises, it moves upward and to the left along an acute angle as illustrated in the sequence of FIGS. 5a, 6a, and 7a. The arm support tube 100 does not move laterally within the splash panel 22, rather the arm support tube 100 moves only in the vertical direction due to its positioning within the arm support bearing housing 102. Therefore, it is necessary for the first clevis 58 and the second clevis 60 to slide relative to one another to accommodate the vertical and lateral movement of the first clevis. To achieve this goal, the first clevis 58 and the second clevis 60 are shaped as illustrated in the figures, although other shapes are possible as discussed above.

As also can be seen in FIG. 3, the counterweight 110 has moved downward within the counterweight guide 116. The counterweight 110 aids the pneumatic cylinder 42 in lifting the weight of the arm support tube 100, the arm assembly 70, and the other components attached thereto.

Referring to FIG. 4, the detachers 20 has moved to the retracted position wherein the arm assembly 70 is completely folded and the arm support tube 100 has been moved to its upper most vertical position. It can be seen in FIG. 4, FIG. 7a, and FIG. 7b that the first clevis 58 and the second clevis 60 are not engaged. This is a result of the first chain 64 becoming fully tensioned prior to full cylinder retraction. The continued retract force of the cylinder 42 and piston 44 folds the arm assembly 70 in and vertically pulls up the arm support tube 100 against a stop in the arm support bearing housing 102.

To reverse the process and extend and lower the detacher 20, the pneumatic or electronic controls 36 activate the pneumatic\electronic controller 38 to lower the piston 44 which enables an operator to unfold the arm assembly 70 and pull down the arm support tube 100 to position the milking machine under the cow 16 and begin milking operations. The operator's pull causes the counterweight 110 and arm assembly 70 to move to the most desirable milking position as illustrated in FIG. 2.

Figure 9:
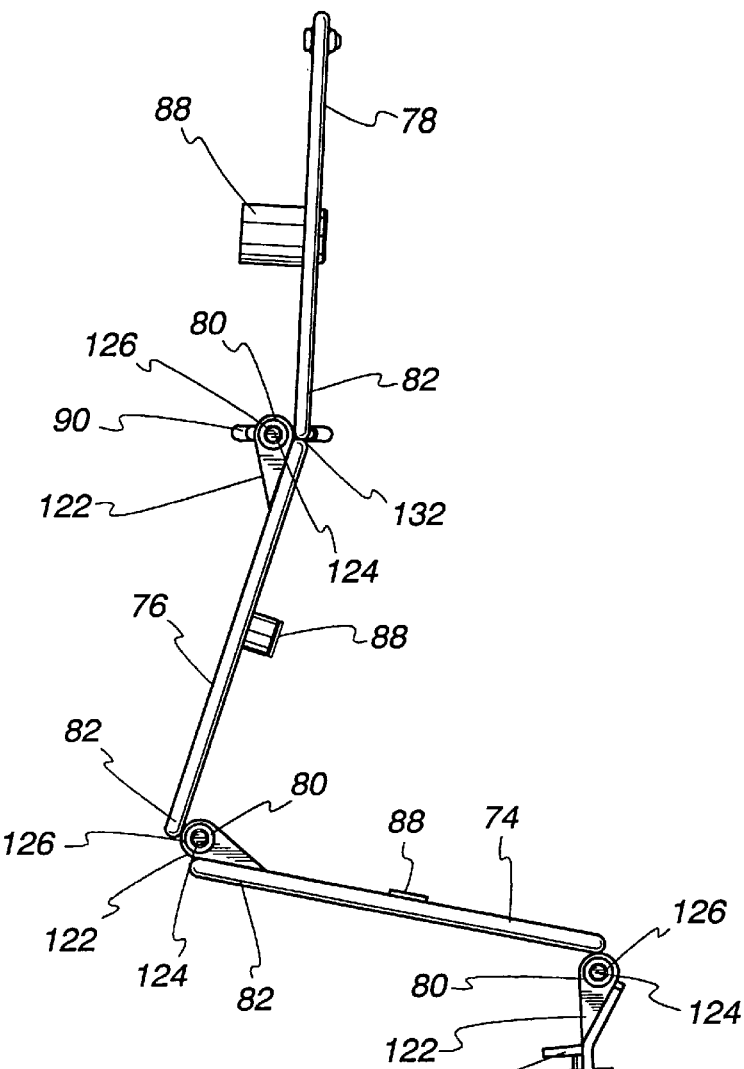
FIG. 9 is a plan view of the arm assembly partially folded.
Figure 10:
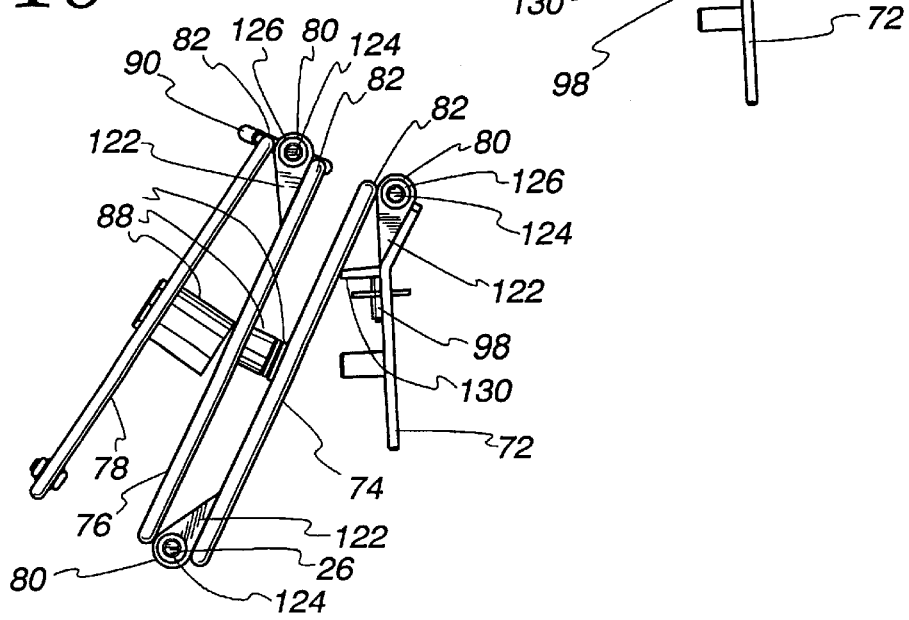
FIG. 10 is a plan view of the arm assembly completely folded.

Additional details of the arm assembly 70 are depicted in FIGS. 8 through 10. As stated above, the arm assembly 70 includes three arm segments 74, 76, 78 that are joined together at hinges 80. Each hinge 80 includes a cylinder 120 welded to the cylindrical rod 82 which is then joined to flanges 122 on an adjacent arm segment by a pin 124. The pins 124 are joined to the cylinders using sets screws (not illustrated) and to the flanges 122 using appropriate retaining rings 126. As stated above, the cylinders 120 and flanges 122 operates smoothly using appropriate bearings 127 and lubricant. As can be seen in FIG. 8, the pin 124 between arm segments 76 and 78 is extended with a lower cylindrical portion 128 to receive the hose hook 90.

The chain bushings 88 in arm segments 76 and 78 are extended, as depicted in FIGS. 9 and 10 so that when the arm assembly 70 is completely folded the arm segments will be maintained in a spaced relationship to prevent pinch points from developing. In addition, a stop plate 130 is welded to the arm support plate 72 to maintain additional spacing and avoid pinch points.

Further, to avoid possible pinch points, the cylindrical rod 82, as illustrated in FIG. 9, tends to force away anything that might otherwise be pinched at point 132, for example. It can also be seen that rounding flanges 122 reduces the chance that anything can be pinched between adjacent arm segments.

Except where indicated above, the detacher components are desirably made of stainless-steel, plastic or other corrosion resistant material to withstand the conditions of a milking parlor.

The foregoing detailed description of drawings is provided for clearness of understanding only and no unnecessary limitations therefrom should be read into the following claims.

What is claimed is:

1. A milking machine detacher comprising:

a reciprocating piston;

a first engaging member fixed to the reciprocating piston;

a first tension member having a first end fixed to the reciprocating piston and a second end;

an articulated milker arm joined to the second end of the first tension member, the milker arm being foldable in response to an upward movement of the reciprocating piston and the first tension member;

a vertically movable milker arm support joined to the articulated milker arm;

a second engaging member joined to the milker arm support and arranged to be engaged by the first engaging member to raise the milker arm support and the articulated milker arm in response to an upward movement of the reciprocating piston and the first engaging member;

a second tension member having a first end connected to the milker arm support and a second end; and a counterweight joined to the second end of the second tension member to counterbalance the milker arm support and the articulated milker arm.

2. The milking machine detacher of claim 1, and further comprising:

a sloped splash panel in which the piston, the first engaging member, the second engaging member, the milker arm support, and the counterweight are mounted.

3. The milking machine detacher of claim 2, wherein the milker arm support includes a tapered upper end for being disposed adjacent to the sloped splash shield when the detacher is in a retracted position.

4. The milking machine detacher of claim 1, and further comprising:

an automatic controller for reciprocating the piston.

5. The milking machine detacher of claim 1, wherein the first engaging member and the second engaging member are disengaged when the detacher is at a fully extended position, slidably engaged during a detacher retracting movement and disengaged in a detacher retracted position.

6. The milking machine detacher of claim 1, wherein the milker arm moves in an arc-shaped pattern between a fully extended position, a retracting position, and a retracted position.

7. The milking machine detacher of claim 1, and further comprising:

a first roller fixed to the reciprocating piston and in sliding contact with the first tension member; and a second roller fixed against vertical movement and in sliding contact with the first tension member.

8. The milking machine detacher of claim 1, wherein the first engaging member includes a longitudinal horizontal axis, and the second engaging member includes a longitudinal horizontal axis orientated transversely to the horizontal axis of the first engaging member.

9. The milking machine detacher of claim 1, wherein the articulated milker arm includes a plurality of arm segments and a bushing mounted in one of the arm segments and through which the first tension member extends, the bushing extending laterally toward adjacent arm segments to maintain a space between adjacent arm segments when the articulated milker arm is in a folded position.

* * * * *